US010287189B2

(12) United States Patent
Tedhams (10) Patent No.: US 10,287,189 B2
(45) Date of Patent: May 14, 2019

(54) ELECTROCOAGULATION REACTORS HAVING PELLET FLOW CIRCUITS

(71) Applicant: Carden Water Systems, LLC, Phoenix, AZ (US)

(72) Inventor: Marc Tedhams, Phoenix, AZ (US)

(73) Assignee: CARDEN Water Systems, LLC, Phoenix, AZ (US)

(*) Notice: Subject to any disclaimer, the term of this patent is extended or adjusted under 35 U.S.C. 154(b) by 370 days.

(21) Appl. No.: 15/137,948

(22) Filed: Apr. 25, 2016

(65) Prior Publication Data

US 2017/0305764 A1 Oct. 26, 2017

(51) Int. Cl.
*C02F 1/46* (2006.01)
*C02F 1/463* (2006.01)
(Continued)

(52) U.S. Cl.
CPC .......... *C02F 1/463* (2013.01); *C02F 1/46114* (2013.01); *C02F 1/40* (2013.01); *C02F 2001/46133* (2013.01); *C02F 2001/46171* (2013.01); *C02F 2201/4611* (2013.01); *C02F 2201/4618* (2013.01); *C02F 2201/48* (2013.01); *C02F 2301/024* (2013.01);
(Continued)

(58) Field of Classification Search
CPC .......... C02F 1/46104; C02F 2201/4611; C02F 2001/46171; C02F 2103/08; C02F 2201/46145; C02F 2103/026
USPC ...................................................... 204/275.1
See application file for complete search history.

(56) References Cited

U.S. PATENT DOCUMENTS

| 5,558,755 A | 9/1996 | Gardner-Clayson et al. |
| 9,085,745 B2 | 7/2015 | Eckelberry et al. |

(Continued)

FOREIGN PATENT DOCUMENTS

| EP | 1156014 A1 | 11/2001 |
| GB | 1560732 | 2/1980 |

OTHER PUBLICATIONS

European Patent Office International Searching Authority, International Search Report and Written Opinion for International Application No. PCT/US2017/029387 dated Jul. 6, 2017.

(Continued)

*Primary Examiner* — Zulmariam Mendez
(74) *Attorney, Agent, or Firm* — Lorenz & Kopf, LLP (57) ABSTRACT

Electrocoagulation (EC) reactors having pellet flow circuits are disclosed. In one embodiment, the EC reactor includes a reactor vessel having a first inlet and an outlet through which a contaminated feed stream is received and discharged, respectively. An EC reaction chamber is located within the reactor vessel, fluidly coupled between the first inlet and the outlet, and configured to be loaded with consumable EC pellets. The EC reactor further includes an EC pellet flow circuit around which the consumable EC pellets circulate as the contaminated feed stream flows through the EC reaction chamber. First and second electrodes are coupled to the reactor vessel and positioned to generate an electrical field. The consumable EC pellets are exposed to (e.g., pass through or circulate within) the electrical field to induce coagulation of contaminants within the contaminated feed stream as the feed stream flows through the EC reaction chamber.

20 Claims, 5 Drawing Sheets

(51) Int. Cl.
  *C02F 1/461* (2006.01)
  *C02F 1/40* (2006.01)
(52) U.S. Cl.
  CPC .. *C02F 2301/026* (2013.01); *C02F 2301/028* (2013.01); *C02F 2303/04* (2013.01)

(56) References Cited

U.S. PATENT DOCUMENTS

2011/0297552 A1    12/2011  Boyle et al.
2015/0251932 A1*    9/2015  Laaroussi ............... C02F 1/463
                                                   205/701
2016/0280566 A1*    9/2016  Rau, III .................. C02F 1/463

OTHER PUBLICATIONS

Moreno, Hector A., et al., Lamar University, Beaumont; TX, Morkovsky, Paul, Shinner TX, J. R. Parga, Tecnologico de Saltillo, Saltillo, Coah., Mexico. "Electrocoagulation: COD Removal Mechanism".

Barkley, Naomi, P., et al. "Emerging Technology Summary: Electro-Pure Alternating Current Electrocoagulation", United States Environmental Protection Agency, EPA/540/S-93/504, Sep. 1993.

Siringi, Daniel Ogwoka, et al., "Is Electrocoagulation (EC) A Solution to the Treatment of Wastewater and Providing Clean Water for Daily Use", ARPN, Journal of Engineering and Applied Sciences, vol. 7, No. 2, Feb. 2012.

* cited by examiner

ELECTROCOAGULATION REACTORS HAVING PELLET FLOW CIRCUITS

TECHNICAL FIELD

The present invention relates generally to fluid treatment systems and, more particularly, to electrocoagulation reactors having pellet flow circuits and providing highly efficient, low maintenance reactor operation.

BACKGROUND

Electrocoagulation (EC) reactors are utilized in the treatment of wastewater and other contaminated fluid streams. An EC reactor operates by injecting ions into a solution or stream in a manner causing particulate contaminants suspended within the stream to conglomerate or coagulate. The larger coagulated particles are then discharged from the EC reactor within an effluent stream, which is further treated (e.g., by sedimentation and/or filtration) to remove the coagulated particles therefrom. In this manner, the usage of an EC reactor can facilitate purification of a contaminated feed stream containing impurities initially present as relatively small particles, which may otherwise be difficult to remove from the feed stream. In so doing, the EC reactor also reduces demands placed on the fluid treatment system or systems downstream of the reactor. EC processes can advantageously be utilized to induce conglomeration of a wide range of particulate impurities within contaminated feed streams including suspended solids, heavy metals, oil, grease, fats, organic compounds, bacteria, and silica, to list but a few examples. Additionally, EC processes tend to have a greater efficacy and to generate less sludge waste relative to other coagulation processes, such as chemical coagulation. As a still further advantage, the electrical current directed through the contaminated feed stream during the electrocoagulation process may help eradicate any living organisms (e.g., bacteria and pathogens) present within the feed stream.

By common design, an EC reactor contains at least two consumable metal electrodes (e.g., a dedicated cathode and anode) between which the contaminated feed stream flows during operation of the reactor. The consumable metal electrodes may be, for example, aluminum or iron plates arranged in a parallel-plate configuration. When properly energized, the consumable metal electrodes release ions (e.g., metal and/or hydrogen ions) into the contaminated feed stream to induce reactions driving coagulation of the impurities carried by the feed stream (collectively referred to as "EC reactions"). Generally, the EC reactions accelerate as the electrical potential between the consumable metal electrodes is increased by, for example, boosting the current supplied to the consumable metal electrodes. Reactor efficiency can thus be enhanced by operating the reactor at relatively high electrical potentials to more thoroughly destabilize the contaminant-water bonds and/or to more effectively eradicate living organisms within the feed stream. Conventional EC reactors are, however, prone to rapid corrosion of the consumable metal electrodes, a problem which is exacerbated when the reactor is operated at high electrical potentials for prolonged periods of time. As corrosive build-up develops on the surfaces of the metal electrodes, the EC reactor is rendered less effective at inducing the desired EC reactions and becomes inefficient from a power consumption standpoint. When sufficiently severe, corrosive build-up on the electrode surfaces may necessitate shutdown of the EC reactor for acid bath cleaning, adding further cost and inefficiency to reactor operation.

It is thus desirable to provide embodiments of a highly efficient EC reactor, which can be operated at relatively high electrical potentials over prolonged time periods with decreased maintenance requirements. Ideally, embodiments of such an EC reactor would also have a relatively straightforward, structurally robust, and cost-effective construction. Other desirable features and characteristics of embodiments of the present invention will become apparent from the subsequent Detailed Description and the appended Claims, taken in conjunction with the accompanying drawings and the foregoing Background.

BRIEF SUMMARY

Electrocoagulation (EC) reactors having pellet flow circuits are disclosed. In one embodiment, the EC reactor includes a reactor vessel having a first inlet and an outlet through which a contaminated feed stream is received and discharged, respectively. An EC reaction chamber is located within the reactor vessel, fluidly coupled between the first inlet and the outlet, and loaded with consumable EC pellets prior to operation of the EC reactor. The EC reactor further includes an EC pellet flow circuit around which the consumable EC pellets circulate as the contaminated feed stream flows through the EC reaction chamber. First and second electrodes are coupled to the reactor vessel and positioned to generate an electrical field within the EC reaction chamber. The circulating consumable EC pellets are exposed to (e.g., pass through or circulate within) the electrical field to induce coagulation of contaminants within the contaminated feed stream as the feed stream flows through the EC reaction chamber.

In another embodiment, the EC reactor includes an inner annular electrode, an outer annular electrode circumscribing the inner annular electrode, and an EC reaction chamber in which consumable EC pellets are held. The EC reaction chamber has inner and outer circumferences, which are at least partially bound by the inner and outer annular electrodes, respectively. A feed stream flow path extends through the EC reaction chamber. During operation of the EC reactor, the feed stream flow path conducts a contaminated feed stream, which contacts the consumable EC pellets held within the EC reaction chamber. In certain implementations, the EC reactor may also include an EC pellet flow circuit about which the consumable EC pellets travel as the contaminated feed stream flows through the EC reaction chamber. Stated differently, the consumable EC pellets may be suspended within the contaminated feed stream, which carries the EC pellets around the EC pellet flow circuit. In such implementations, the EC pellet flow circuit may circumscribe the inner annular electrode, while further being circumscribed by the outer annular electrode.

In a further embodiment, the EC reactor includes a reactor vessel having a first inlet at which a contaminated feed stream is received, an outlet from which the contaminated feed stream is discharged, and a feed stream flow path fluidly coupling the first inlet to the outlet. An EC reaction chamber is located within the reactor vessel and may have, for example, a generally annular geometry that is substantially concentric with a centerline of the reactor vessel. The feed stream flow path extends through the EC reaction chamber, which is at least partially filled with consumable EC pellets. A cyclonic feed stream injection chamber is fluidly coupled to the EC reaction chamber. The cyclonic feed stream injection chamber imparts the contaminated feed stream with a tangential flow component or swirling action when entering the EC reaction chamber to drive circulation of the consumable EC pellets around the EC reaction chamber circuit during operation of the EC reactor. In one embodiment, the reactor vessel has a centerline along which the feed stream flow path extends and around which the consumable EC pellets circulate.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the following description provides only multiple non-limiting examples of the invention and should not be construed to restrict the scope of the invention, as set-out in the Claims, in any respect. The term "axial," as appearing herein, is define as a direction extending parallel to the centerline or longitudinal axis of the electrocoagulation reactor, while the term "radial" is defined as a direction perpendicular to the axial direction.

The following describes embodiments of a highly efficient, low maintenance Electrocoagulation (EC) reactor. The EC reactor includes an EC reaction chamber into which consumable EC pellets are loaded. During operation of the EC reactor, the consumable EC pellets are contacted by a contaminated feed stream, which conveys the EC pellets about a continual loop or flow circuit provided within the EC reaction chamber. Concurrently, an electrical field is generated within the EC reaction chamber causing the EC pellets to shed metal ions, hydrogen, and/or otherwise interact with the contaminated feed stream in a manner inducing the desired EC reactions. Circulation of the EC pellets about the EC pellet flow circuit may be driven by imparting the contaminated feed stream with a tangential flow component or "swirl" when injecting the feed stream into the EC reaction chamber. This can be accomplished by passing the contaminated feed stream through a feed stream injection chamber, which imparts the stream with a cyclonic flow pattern, prior to introduction of the feed stream into the EC reaction chamber. Additionally or alternatively, the feed stream may be directed through a perforated distributor plate positioned between the feed stream injection chamber and the EC chamber. The perforated distributor plate may have angled channels or openings formed therethrough, which further impart the contaminated feed stream with the desired tangential flow component as the feed stream flows through the distributor plate and into the EC reaction chamber.

It has been found that embodiments of the EC reactor minimize contaminant (e.g., corrosive) build-up on the external surfaces of the circulating EC pellets. Furthermore, the EC pellets are maintained in a relatively clean state even when the reactor is operated at relatively high electrical potentials. Without being bound by theory, it is believed that movement of the EC pellets about the EC pellet flow circuit including abrasive contact between circulating pellets and/or with the electrode surfaces may contribute to preventing or at least deterring corrosive build-up on the pellet surfaces. Contaminant build-up on the pellet surface may further be reduced by energizing the electrodes EC reactor with an alternating current in certain embodiments. Additionally, agitation caused by circulation and collision of the pellets may also contribute to pellet cleanliness and/or otherwise promote the EC reactions. By maintaining the EC pellets in a reduced-contaminant or contaminant-free state, the EC reactions can be sustained at a relatively high rate over a prolonged operational period to boost reactor efficiency, while minimizing the maintenance requirements of the EC reactor. Operation of the EC reactor at higher electrical potentials may also increase the effectiveness with which any living organisms (e.g., pathogens or bacteria) present within the contaminated feed stream are eradicated. Embodiments of the EC reactor may include various other unique structural features further benefiting the performance and/or construction of the reactor, as explained more fully below. An exemplary embodiment of an EC reactor will now be described in conjunction with FIGS. 1-6.

Figure 1:
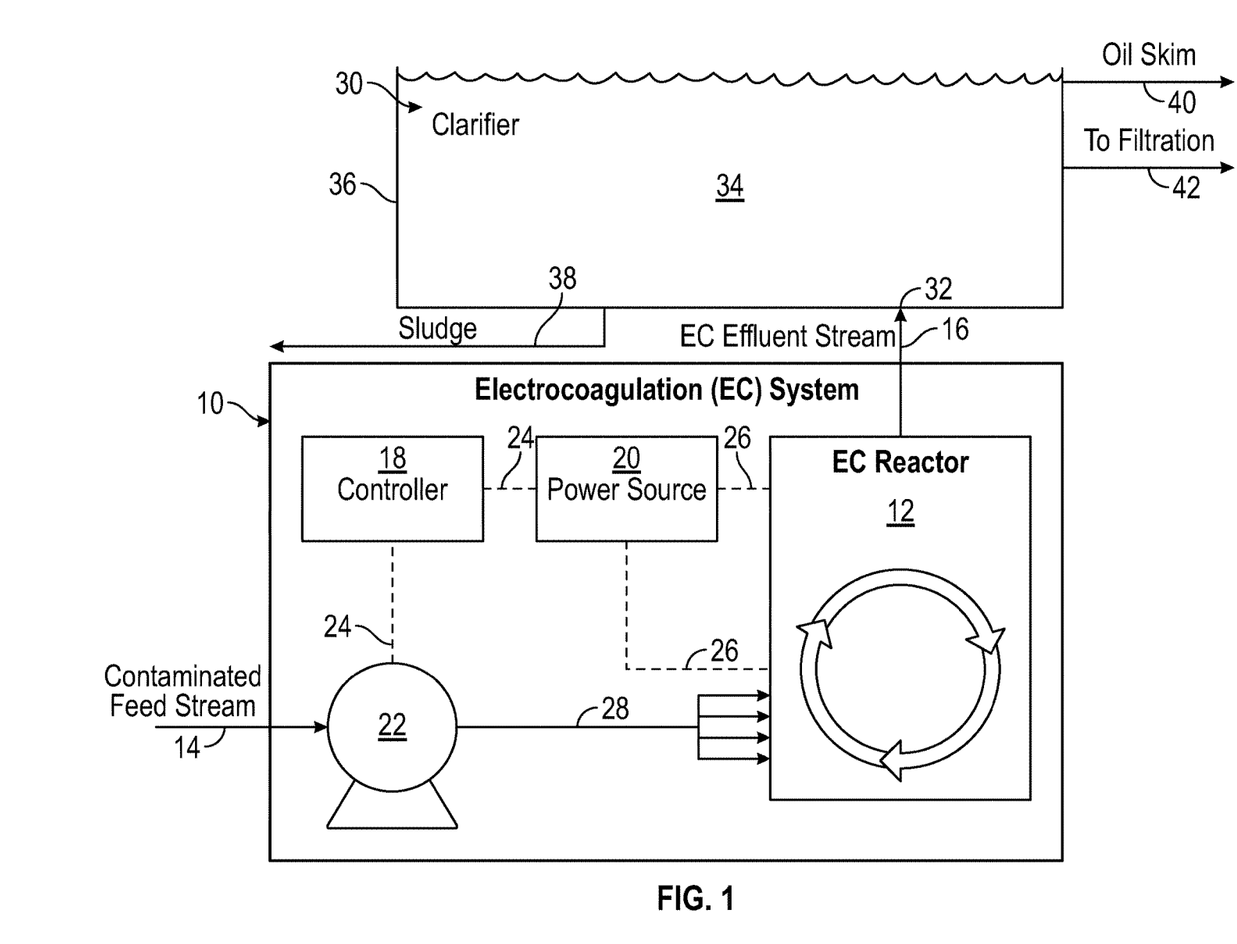
FIG. 1 is a flow schematic of Electrocoagulation (EC) system including an EC reactor, as illustrated in accordance with an exemplary embodiment of the present invention.

FIG. 1 is a flow schematic of an EC system 10 including an EC reactor 12, as illustrated in accordance with an exemplary embodiment of the present invention. EC system 10 includes an inlet (represented by arrow 14) through which a contaminated feed stream is received and outlet (represented by arrow 16) from which the feed stream is discharged. EC system 10 further includes a controller 18, a power source 20, and a main pump 22. As indicated by dashed lines 24, controller 18 is operably coupled to power source 20 and to pump 22. Power source 20 is, in turn, electrically coupled to at least two non-illustrated electrodes included within EC reactor 12, as further indicated by dashed lines 26. An inlet of pump 22 is fluidly coupled to the inlet of EC system 10, while an outlet of pump 22 is fluidly coupled to at least one inlet of EC reactor 12. As indicated by branched flow line 28, a single outlet of pump 22 may direct the contaminated feed stream into a main conduit, which splits or divides into multiple conduits. The multiple conduits may then inject fractions of the contaminated feed stream (streamlets) into EC reactor 12 through a like number of inlets provided in the reactor vessel. Such a multi-inlet configuration may help to provide a uniform flow field beneath the EC pellet cluster and/or impart the contaminated feed stream with a swirling action when entering into the reaction chamber of EC reactor 12.

Controller 18, power source 20, and pump 22 can each assume any form suitable for performing the functions described herein. Controller 18, in particular, can be implemented utilizing any suitable number of individual microprocessors, navigational equipment, memories, power supplies, storage devices, interface cards, and other standard components known in the art. In this respect, the controller 18 may include or cooperate with any number of software programs or instructions designed to carry out the various methods, process tasks, calculations, and control functions described below. Power source 20 can be any current source or voltage source suitable for energizing the electrodes of EC reactor 12. In one embodiment, power source 20 is an alternating current source, which is controlled by controller 18 during operation of EC reactor 12 to periodically change the polarity of the EC reactor electrodes. Main pump 22 can be, for example, an electrically-driven, positive displacement or a centrifugal pump. In other implementations, EC system 10 may include a different type of pump or reactor 12 may receive a gravity feed, in which case pump 22 may be eliminated. Although not shown in FIG. 1 for clarity, EC system 10 can include additional components (e.g., boost pumps, valves, and sensors) in further embodiments.

Various different systems and devices may be positioned downstream of EC system 10 to remove the agglomerated contaminants or impurities from the feed stream discharged through outlet 16. For example, and as further indicated in FIG. 1, a sedimentation tank or clarifier 30 may be provided downstream of EC system 10. Clarifier 30 may receive the contaminated feed stream from EC system 10 at an inlet 32, which discharges the stream into a fluid body 34 retained in tank 36. Over time, some fraction of the coagulated contaminants settles to the bottom of tank 36 and is removed through a solids or sludge drain pipe 38. Another fraction of the coagulated contaminants is collected by a skimmer device (not shown) for removal through an oil outlet 40. Finally, a fraction of the contaminant-containing liquid may be gradually drawn from fluid body 34 through a liquid outlet or tap 42 and supplied to a non-illustrated filtration unit (e.g., an ultrafiltration unit) downstream of clarifier 30. In further embodiments, additional filtration systems, sedimentation systems, or other components can be utilized to remove the coagulated contaminants from the treated (e.g., wastewater) stream. For example, in certain embodiments, clarifier 30 may be eliminated and the contaminated feed stream discharged by EC system 10 may be supplied directly to a filtration system. Such an arrangement may, however, subject the filtration system to considerably greater contaminant loads, which can potentially foul the system filters at an undesirably rapid rate.

Figure 2:
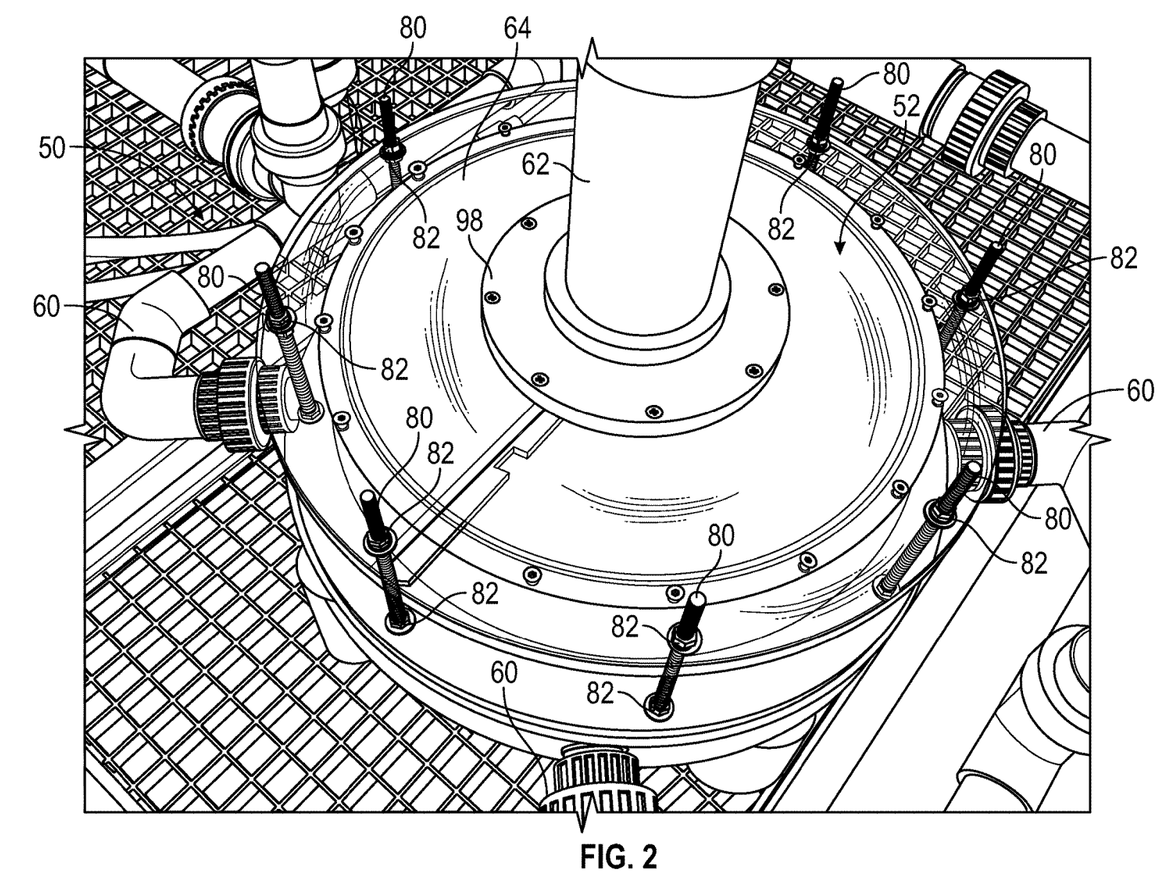
FIGS. 2 and 3 are isometric and cross-sectional views, respectively, of an EC reactor, which is suitable for usage in the EC system of FIG. 1, which includes an EC reaction chamber containing an EC pellet flow loop, and which is illustrated in accordance with an exemplary embodiment of the present invention.
Figure 3:
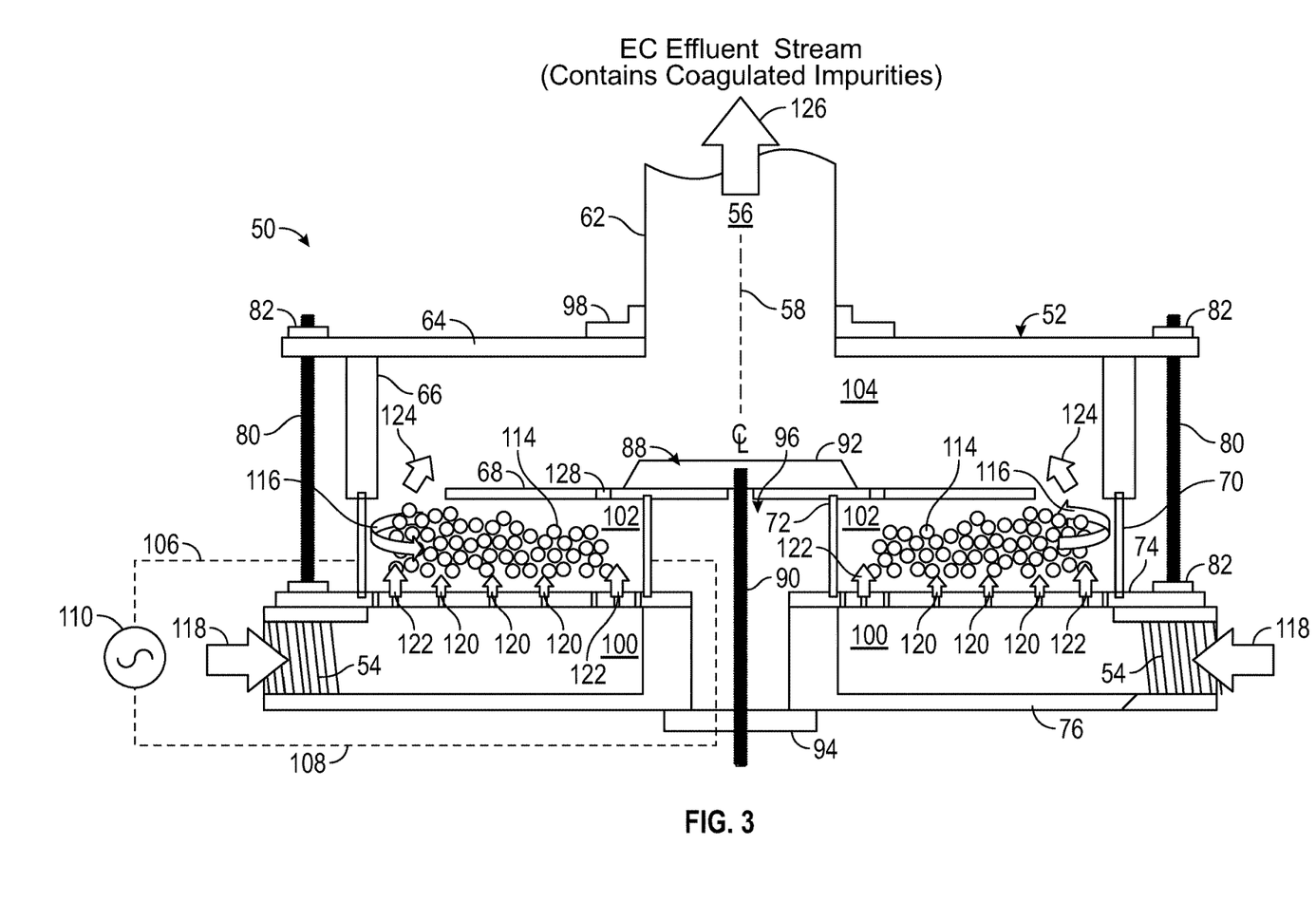

FIGS. 2 and 3 are isometric and cross-sectional views, respectively, of an EC reactor 50, which is illustrated in accordance with an exemplary embodiment of the present invention and which can be utilized as EC reactor 12 within EC system 10 (FIG. 1). Referring primarily to FIG. 3, EC reactor 50 includes a reactor vessel 52 having plurality of inlets 54, an outlet 56, and a longitudinal axis or centerline 58. Reactor vessel 52 is vertically oriented in the illustrated example such that centerline 58 extends in essentially a vertical direction; the term "vertical direction," as appearing herein, defined as a direction parallel to gravity. Inlets 54 are circumferentially spaced around a lower portion of reactor vessel 52, while outlet 56 is provided through the topmost portion of reactor vessel 52. A plurality of flow lines, such as pipes 60 shown in FIG. 2, may be connected to inlets 54 when EC reactor 50 is fluidly interconnected within a larger EC system, such as EC system 10 (FIG. 1). During operation of EC reactor 12, pipes 60 (FIG. 2) direct contaminated feed streamlets into reactor vessel 52 through inlets 54. Within reactor vessel 52, the contaminated feed streamlets are consolidated into a contaminated feed stream, which is then conducted through vessel 52 and subjected to the below-described electrocoagulation process. After electrocoagulation, the contaminated feed stream is discharged through outlet 56 and into an outlet pipe 62, which may extend upwardly from reactor vessel 52 in a generally vertical direction.

Reactor vessel 52 can be produced from any number of components, which can be interconnected in various different manners to form a fluid-tight flowbody or vessel. In the illustrated example, and generally progressing from top to bottom in FIG. 3, reactor vessel 52 includes a cover piece 64, an upper wall section 66, a radially-extending baffle 68, an outer annular electrode 70, an inner annular electrode 72, a perforated distributor plate 74, and a base piece 76. Perforated distributor plate 74 is positioned over and supported by base piece 76, which serves as the foundation of vessel 52. Outer and inner annular electrodes 70 and 72 are positioned over outer and inner annular portions of distributor plate 74, respectively. Upper wall section 66 is further disposed over outer annular electrode 70 and may help retain electrode 70 in its desired position. Cover piece 64 is positioned over upper wall section 66, which extends axially from outer annular electrode 70 to the underside of cover piece 64. Inner annular electrode 72 extends axially from perforated distributor plate 74 to baffle 68. Radially-extending baffle 68 is positioned over inner annular electrode 72 and projects radially therefrom toward outer annular electrode 70. Radially-extending baffle 68 terminates prior to contacting outer annular electrode 70, however, such that an annular gap or opening is provided between baffle 68 and electrode 70 through which the feed stream may flow, as described below. The foregoing components are substantially coaxial with centerline 58 in the illustrated example; however, this need not be the case in all embodiments.

While shown in cross-section in FIG. 3, it will be appreciated that aforelisted components are generally axisymmetric about centerline 58. In this regard, cover piece 64, baffle 68, and perforated distributor plate 74 may have substantially disk-shaped geometries; while, upper wall section 66, outer electrode 70, and inner electrode 72 may have substantially tubular geometries. Electrodes 70 and 72, in particular, may be substantially annular or tubular structures fabricated from an electrically-conductive material. In one embodiment, electrodes 70 and 72 are metal (e.g., stainless steel) sheets, which are rolled formed into tubular shapes and welded along their longitudinal edges to form fluid-tight enclosures. Those components contacting electrodes 70 and 72 can be produced from non-conductive materials to prevent electrical bridging; e.g., baffle 68, tubular wall section 66, and/or perforated distributor plate 74 can be produced from a ceramic or a polymeric material (e.g., acetyl plastic) in an embodiment. Alternatively, additional electrically-insulative pieces (e.g., polymeric gaskets) can be provided at the appropriate interfaces with electrodes 70 and 72. As shown most clearly in FIG. 2, cover piece 64 and baffle 68 are usefully produced from a transparent material (e.g., acrylic) to permit visual inspection of the below-described EC reaction chamber and pellet flow circuit without disassembly of EC reactor 50.

To prevent leakage from reactor vessel 52, EC reactor 50 may include any number and combination of sealing elements, clamp members, fasteners, and the like. For example, as shown in FIGS. 2 and 3, EC reactor 50 may further include a number of threaded shafts 80, which extend through cover piece 64 and into base piece 76 to exert an axial clamping force across the structural components forming the body of vessel 52. Shafts 80 extend through openings circumferentially spaced around cover piece 64, through axially-aligned openings circumferentially spaced around perforated distributor plate 74, and into threaded bores 86 provided in base piece 76 (shown in FIG. 6). A number of nuts 82 are tightened against cover piece 64 and against perforated distributor plate 74 to exert an axial clamping force between cover piece 64 and an outer portion of base piece 76 (the axial clamping force transmitted through upper wall section 66, through outer annular electrode 70, and through an outer portion of perforated distributor plate 74) to help ensure a fluid-tight coupling between these components. An annular collar 98 is further provided at the interface between outlet pipe 62 and cover piece 64 for added sealing or interconnection purposes. Various gaskets, O-rings, or other seal elements (not shown) may be provided to further prevent leakage from reactor vessel 52, as appropriate.

An inner clamp mechanism 88 is further utilized to exert an axial clamping force across baffle 68, inner annular electrode 72, an interior portion of perforated distributor plate 74, and an inner portion of base piece 76 to further provide the desired fluid-tight couplings. Clamp mechanism 88 may include a threaded shaft 90, an inner cap piece 92 engaged by a first end of threaded shaft 90, and an internal cap piece 94 engaged by a second opposing end of threaded shaft 90. Threaded shaft 90 extends through an inner cavity 96, which is provided within reactor vessel 52 and which is circumscribed by inner annular electrode 72, perforated distributor plate 74, and base piece 76. Inner cavity 96 is referred to herein as a "dry cavity" to indicate that cavity 96 is fluidly isolated from the liquid-conducting chambers of reactor vessel 52 and may be, for example, an air-filled cavity open to the ambient environment. An opening or channel is provided through a central portion of base piece 76 to permit external access to dry inner cavity 96 facilitating electrical connection to inner electrode 72, as discussed below.

Inner annular electrode 72 forms an interior wall of reactor vessel 52, while outer annular electrode 70 forms an outer wall thereof. Such a "tube-in-tube" configuration facilitates dry power cable connections to electrodes 70 and 72. In this regard, dashed lines 106 and 108 shown in FIG. 3 represent power connections from an alternating current (A/C) source 110 to electrodes 70 and 72, respectively. The electrical connection represented by dashed line 106 may electrically couple a first terminal of A/C source 110 to a connection point provided on the exterior or external circumference of outer annular electrode 70. Conversely, the electrical connection represented by dashed line 108 may extend from A/C source 110, through dry cavity 96, and to inner annular electrode 72 to electrically couple a second terminal of source 110 to a connection point provided on the interior or inner circumference of inner annular electrode 72. Such a dry power connections eases sealing requirements to reduce the cost and complexity of the EC reactor build. This notwithstanding, electrodes 70 and 72 need not form outer and inner walls of reactor vessel 52 in all embodiments. In an alternative implementation, electrode 70 and/or electrode 72 can be wholly contained within reactor vessel 52. Moreover, electrodes 70 and 72 need not have an annular form factor in all embodiments, and EC reactor 50 can contain more than two electrodes in certain implementations. For example, in a still further implementation, outer annular electrode 70 and/or inner annular electrode 72 may be replaced by a plurality of arc-shaped or plate-shaped electrodes arranged in a ring formation.

A number of chambers are provided within reactor vessel 52 of EC reactor 50. These chambers include: (i) a feed stream injection chamber 100 provided in a lower portion of reactor vessel 52, (ii) an EC reaction chamber 102 provided in an intermediate portion of reactor vessel 52, and (iii) an upper chamber 104 provided in an upper portion of reactor vessel 52. Base piece 76 and perforated distributor plate 74 combine to define or bound feed stream injection chamber 100. Similarly, perforated distributor plate 74 cooperates or combines with outer annular electrode 70, inner annular electrode 72, and baffle 68 to define EC reaction chamber 102. Specifically, perforated distributor plate 74 bounds a lower portion or the floor of EC reaction chamber 102, outer annular electrode 70 bounds an outer circumferential portion of chamber 102, inner annular electrode 72 bounds an inner circumferential portion of chamber 102, and baffle 68 bounds an upper portion of chamber 102. Inner annular electrode 72 is thus located radially inboard of EC reaction chamber 102, which is located radially inboard of outer annular electrode 70. Feed stream injection chamber 100 and EC reaction chamber 102 each have an annular geometry in the illustrated example, while the geometry of upper chamber 104 is substantially cylindrical. In further embodiments, chambers 100, 102, and 104 may have other shapes and dispositions. Collectively, chambers 100, 102, and 104 form a feed stream flow path 100, 102, 104, which extends through reactor vessel 52 to fluidly couple inlets 54 to outlet 56.

A number of consumable EC pellets 114 are loaded into EC reaction chamber 102. Consumable EC pellets 114 are contacted by the contaminated feed stream as the feed stream flows through EC reaction chamber 102 along feed stream flow path 100, 102, 104. Consumable EC pellets 114 are further directed around an EC pellet flow circuit, which is contained within EC reaction chamber 102 and represented by arrows 116 in FIG. 3. EC pellet flow circuit 116 may thus have a substantially annular geometry, which extends around and which may be substantially concentric with centerline 58 of reactor vessel 52. EC pellet flow circuit 116 may be substantially coaxial with feed stream flow path 100, 102, 104 in an embodiment. Additionally, in at least some embodiments, EC pellet flow circuit 116 may be horizontally-oriented such that flow circuit 116 is bounded, at least in substantial part, by upper and lower horizontal planes orthogonal to centerline 58. Consumable EC pellets 114 can be composed of any material or materials that, when subjected to an adequate electrical current, shed ionic molecules or particles capable of inducing agglomeration of charged impurities within the contaminated feed stream. In one embodiment, the EC pellets are composed of iron pellets, aluminum pellets, copper pellets, or a mixture thereof. As appearing herein, the term "pellets" is broadly defined to encompass discrete pieces, media, or granules of a material, regardless of size and shape, providing that such pellets can travel around EC pellet flow circuit 116 and provide the functions described herein. In general, smaller pellet size may increase surface area-to-volume of EC pellets 114 to facilitate the desired EC reactions; however, EC reactor 50 can be utilized within any suitable pellet or combination of pellets regardless of size, shape, or composition, providing that such pellets support operation of the reactor.

During operation of EC reactor 50, contaminated feed streamlets are received through inlets 54 and reconsolidated into the contaminated feed stream within feed stream injection chamber 100 (indicated in FIG. 3 by arrows 118). The contaminated feed stream flows through perforated distributor plate 74 (as indicated in FIG. 3 by arrows 120 and 122) and into EC reaction chamber 102. Within EC reaction chamber 102, the contaminated feed stream physically contacts consumable EC pellets 114 as EC pellets 114 circulate around EC pellet flow circuit 116 and around inner annular electrode 72. The contaminated feed stream thus suspends EC pellets 114 within EC reaction chamber 102 as a floating bed or rotating mass, which travels around flow circuit 116. At the same time, electrodes 70 and 72 are energized by a power source (e.g., alternating current source 110 schematically illustrated shown in FIG. 3) to generate an electrical field to which consumable EC pellets 114 are exposed; e.g., EC pellets 114 may pass through or circulate within the electrical field generated between electrodes 70 and 72. In one implementation, consumable EC pellets 114 remain within the annular electrical field generated between electrodes 70 and 72 as the pellets travels around the circulation loop and circle inner annular electrode 72. In particular, as indicated in FIGS. 2 and 3, electrodes 70 and 72 may span the entire length or substantially the entire length of EC reaction chamber 102, as taken axially along vessel centerline 58. The electric field generated by electrodes 70 and 72, when energized, may thus extend throughout EC reaction chamber 102. Correspondingly, the rotating mass or floating bed of consumable EC pellets 114 may remain within the electrical field throughout its range of travel about EC pellet flow circuit 116. The horizontal orientation of pellet flow circuit 116 may also help promote a substantially uniform distribution of EC pellets 114 throughout EC reaction chamber 102. The efficiency of EC reactor 50 may be enhanced as a result.

The desired EC reactions are driven by exposure of consumable EC pellets 114 to the electrical field, which induces coagulate the particulate impurities contained within the contaminated feed stream in the previously-described manner. After undergoing electrocoagulation, the contaminated feed stream flows into upper chamber 104 (represented by arrows 124) and exits EC reactor 50 through outlet 56 and outlet pipe 62 (represented by arrow 126). As noted above, continual circulation of consumable EC pellets 114 about EC pellet flow circuit 116 and through the electrical field allows enables the desired EC reactions to occur, while minimizing contaminant build-up on the pellet surfaces even when EC reactor 50 is operated under relatively high current or amperage conditions. EC reactor 50 can thus be operated at such higher electrical potentials to increase reactor efficacy (e.g., to more thoroughly destabilize the contaminant-water bonds and/or to more effectively eradicate living organisms within the feed stream) without excessively rapid contaminant (e.g., corrosive) build-up occurring on the feed stream-exposed surfaces of consumable EC pellets 114, inner annular electrode 72, or outer annular electrode 70. Additionally, agitation caused by circulation and collision of the pellets may also contribute to pellet cleanliness and desired promote the EC reactions. In certain cases, a gas (e.g., air) or other chemicals can be injected into EC reaction chamber 102 or upstream of reaction chamber 102 to further assist in the desired EC reactions.

With continued reference to FIGS. 2 and 3, radially-extending baffle 68 contacts consumable EC pellets 114 as pellets 114 circulate about flow circuit 116 to prevent or at least minimize outflow of pellets 114 into upper chamber 104. In certain embodiments, gas bubbles (e.g., hydroxide microbubbles) may be produced concurrent with the destabilization of the contaminants within the feed stream. As EC reactor 50 is operated at higher electrical potentials and gas bubble production increases, it may be desirable to prevent accumulation or pocketing of the gas bubbles beneath baffle 68. Thus, to prevent build-up of gas bubbles beneath baffle 68, one or more vent holes 128 may be provided through baffle 68 at, for example, a location proximate inner annular electrode 72. In further embodiments, another configuration or structure, such as a mesh screen, can be utilized to prevent or deter outflow of consumable EC pellets 114 from EC reaction chamber 102. A portion of the contaminated feed stream flowing through a central portion of EC reaction chamber 102 (e.g., the portion of the feed stream flowing axially along inner electrode 72 in an upward direction) also impinges the underside of baffle 86, which turns or redirects this portion of the feed stream radially outward toward outer electrode 70. In so doing, baffle 86 helps ensure optimal mixing between the contaminated feed stream and EC pellets 114 to further promote the desired EC reactions prior discharge of the feed stream into upper chamber 104 through the annular gap surrounding the outer circumference edge of baffle 86.

Figure 4:
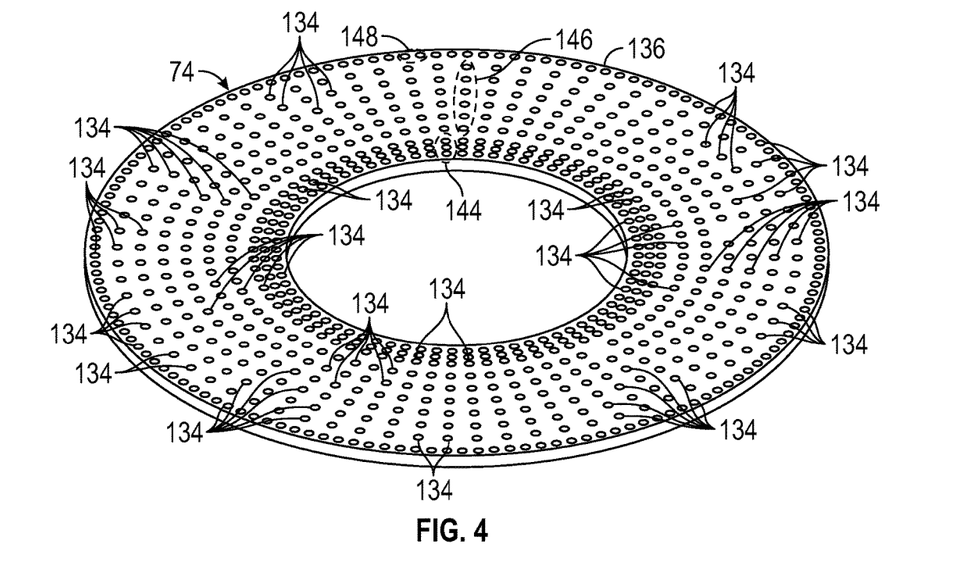
FIG. 4 is an isometric view of a perforated distributor plate included in the EC reactor shown in FIGS. 2 and 3, which has a substantially annular plate body and which is positioned between the feed stream injection chamber and the EC reaction chamber contained within the reactor vessel.

FIG. 4 is an isometric view of perforated distributor plate 74 included in EC reactor 50 (FIGS. 2 and 3). A number of channels or openings 134 is provided through an annular body 136 of distributor plate 74 and arranged in a number of concentric rings or bands. Openings 134 may also be distributed about perforated distributor plate 74 such that a greater flow rate is created near inner or/and outer annular portions or bands of plate 74. In this regard, perforated distributor plate 74 may have an inner annular region having a first opening density (a portion of which is identified in FIG. 4 by circle 144), an outer annular region having a second opening density (a portion of which is identified by circle 146), and an intermediate annular region having a third opening density less (a portion of which is identified by circle 148); the term "opening density" referring to the cross-sectional flow area provided over a region (e.g., an annular band) of perforated distributor plate 74 relative to a solid area of plate 74 as taken over the same region. The second opening density may less than the first opening density and/or the second opening density. In the example shown in FIG. 4, specifically, the cumulative flow area of openings 134 across intermediate annular region 146 is less than the cumulative flow areas of openings 134 across both inner and outer annular regions 144 and 148. In further embodiments, openings 134 can vary in shape (e.g., a number of elongated, arc-shaped openings may be formed through perforated distributor plate 74), dimensions, number, and relative disposition.

By sizing, shaping, and positioning openings 134 in the above-described manner, a greater flow rate can be achieved through distributor plate 74 near the inner and outer portions of plate body 136 during operation of EC reactor 50. This increased flow rate may provide a desired radial standoff between EC pellets 114 and electrodes 70 and 72, which decreases the likelihood of electrical shorting between the electrodes during reactor operation. As a further benefit, the increased flow rate near the inner diameter of perforated distributor plate 74 may help dissipate heat from inner annular electrode 72. If desired, a portion of openings 134 of perforated distributor plate 74 may be angled to turn the feed stream toward inner annular electrode 72 and/or outer electrode 70 to still further promote heat dissipation. In alternative embodiments, other heat dissipation techniques can also be employed, as appropriate, such as forced airflow into dry cavity 96 for increased convective cooling of inner electrode 72. Furthermore, EC reactor 50 need not include a perforated distributor plate in all embodiments; e.g., perforated distributor plate 74 may be replaced by a screen in further implementations.

Figure 5:
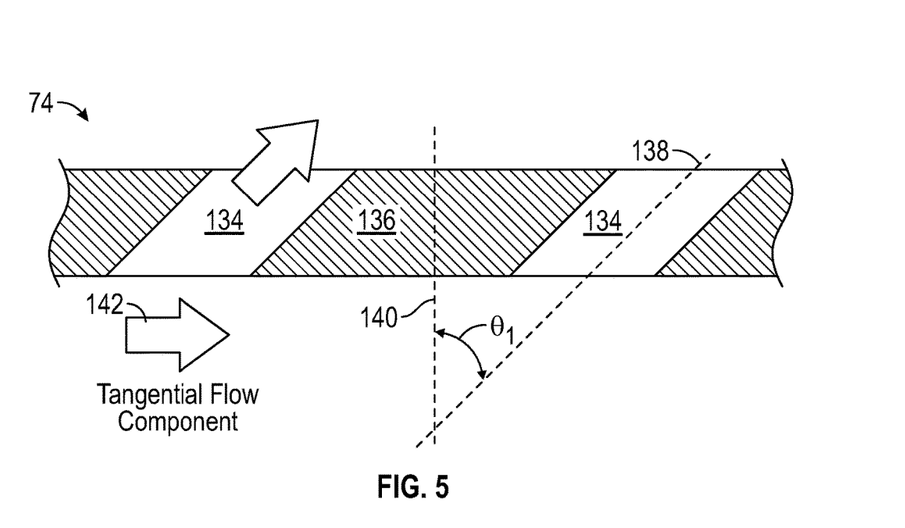
FIG. 5 is a cross-sectional view of a portion of the perforated distributor plate shown in FIGS. 2-4 more clearly illustrating one manner in which angled openings may be formed through the plate body to impart the feed stream with a tangential flow component when entering the EC reaction chamber.
Figure 6:
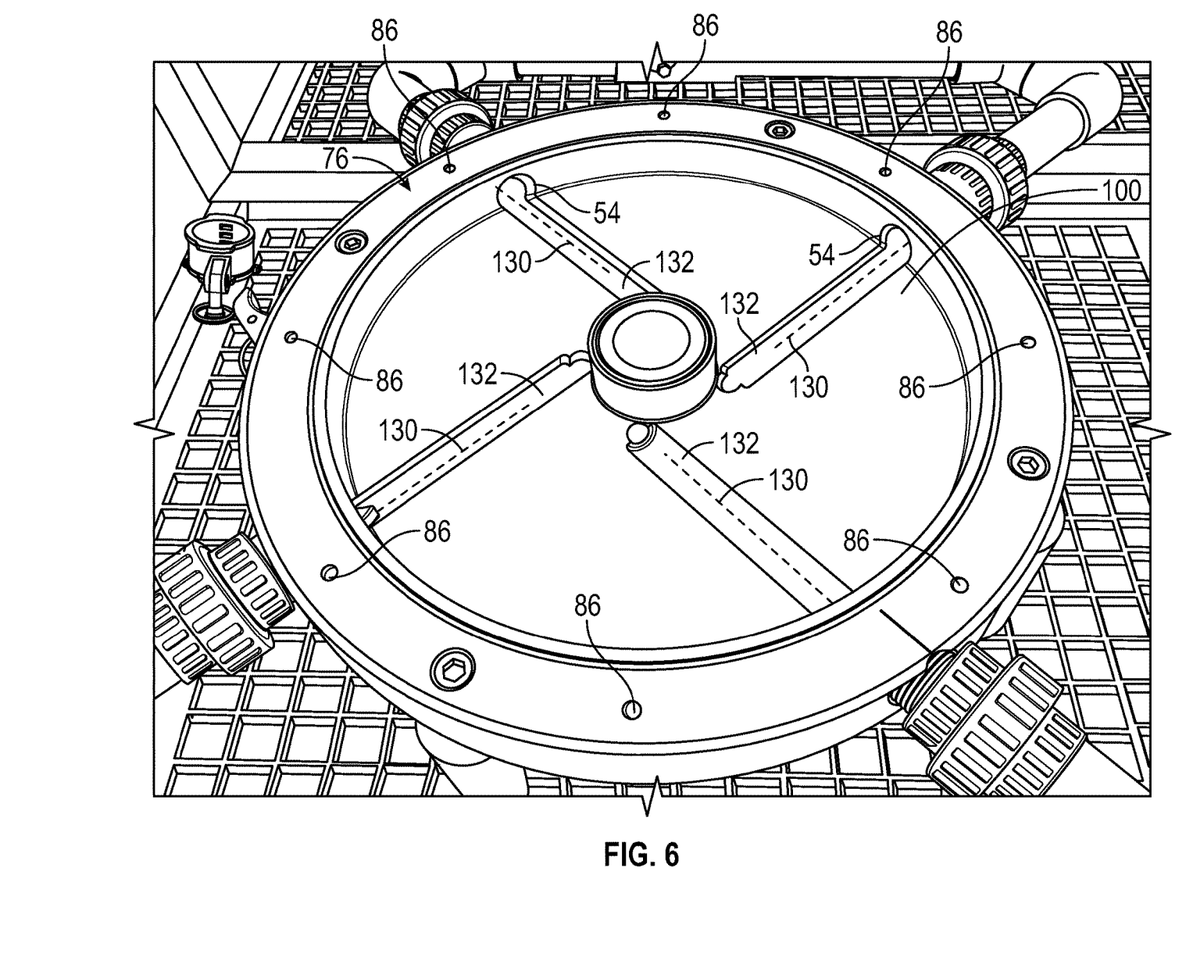
FIG. 6 is an isometric view illustrating a feed stream injection chamber and a number of radially-offset inlets, which are circumferentially-spaced about the injection chamber to create a desired cyclonic flow action further driving circulation of the consumable EC pellets about the EC pellet flow loop during reactor operation.

Circulation of consumable EC pellets 114 about EC pellet flow circuit 116 may be driven by flow of the contaminated feed stream. In particular, EC pellets 114 may be carried around flow circuit 116 by the feed stream, which is imparted with a tangential flow component or swirl when entering EC reaction chamber 102. In this regard, openings 134 provided through perforated distributor plate 74 may be imparted with an angled orientation or tilt to help create the desired swirling flow action. Consider, for example, FIG. 5, which is a cross-sectional view of a relatively small portion of perforated distributor plate 74 including two openings 134. As can be seen, openings 134 each extend along an axis 138 that forms an acute angle $\theta_1$ with a vertical line 140 parallel to the longitudinal axis or centerline 58 of reactor vessel 52. The value of angle $\theta_1$ will vary amongst embodiments, but may be approximately 45° in one, non-limiting instance. Additionally, the orientation of openings 134 is such that openings 134 tilt in the direction of the tangential flow component imparted by cyclonic feed stream injection chamber 100, as indicated in FIG. 5 by arrow 142 and described more fully below. By angling all or a subset of openings 134 provided through perforated distributor plate 74 in this manner, the contaminated feed stream cam be imparted with the desired tangential flow component or swirl when flowing through distributor plate 74 and into EC reaction chamber 102 to help carry consumable EC pellets 114 about EC pellet flow loop 116 and around inner annular electrode 72.

The contaminated feed stream may further be imparted with a tangential flow component or swirl by designing feed stream injection chamber 100 to create a cyclonic flow pattern, prior to introduction of the feed stream into EC reaction chamber 102. This may be more fully appreciated by referring to FIG. 6, which is an isometric view of base piece 76 with perforated distributor plate 74 removed. A number of inlets 54 are circumferentially spaced about cyclonic injection chamber 100 along radially-offset injection axes 130 to induce the desired swirling flow field or cyclonic flow action. Additionally, trenches or furrows 132 are provided extending from injection inlets 54 along radially-offset injection axes 130 to further promote a cyclonic flow action as the feed stream transitions from injection chamber 100 into reaction chamber 102. Injection axes 130 are "radially-offset" in the sense that axes 130 do not align with one another or transect vertical centerline 58 of reactor vessel 52. In the illustrated example, reactor vessel 52 includes four inlets 54, which are separated by a constant angular spacing of 90 degrees (°); however, in further embodiments, reactor vessel 52 may include a different number of inlets 54, which may or may not be spaced uniformly around cyclonic injection chamber 100. The provision of multiple substantially evenly-spaced outlets, such as inlets 54 shown in FIGS. 2, 3, and 6, may also help provide a substantially uniform flow field (a field lacking "dead spots") when injecting the feed stream into EC reaction chamber 102. As a result, the EC pellet cluster or floating bed may be substantially evenly suspended by the flow field created as the feed stream flows from injection chamber 100 into EC reaction chamber 102.

There has thus been provided embodiments of an EC reactor, which can provide highly efficient, low maintenance operation. Specifically, embodiments of the EC reactor may include pellet circulation or flow loops around which consumable EC pellets are circulated during reactor operation. The circulating pellets may be carried around the pellet flow circuit by a feed stream, which is directed through the EC reaction chamber in which the pellets are held. The feed stream may be imparted with a circumferential flow component or swirl to drive circulation of the pellets. It has been found that circulation of the consumable EC pellets about the EC pellet flow circuit can minimize contaminant (e.g., corrosive) build-up on the external surfaces of the circulating pellets. By maintaining the consumable EC pellets in a reduced-contaminant or contaminant-free state, the EC reactions can be maintained at a relatively high rate over a prolonged operational period to boost reactor efficiency, while reducing reactor maintenance requirements. Operation of the EC reactor at higher electrical potentials may also more effectively eradicate living organisms present within the contaminated feed stream. The manufacturing and operational costs of the EC reactor may also be reduced by, for example, producing the reactor vessel from two or more annular electrodes, which are substantially concentric, which circumferentially bound the EC reaction chamber, and to which dry electrical connections can readily be provided.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. An electrocoagulation (EC) reactor, comprising:
    a reactor vessel having a first inlet and an outlet through which a contaminated feed stream is received and discharged, respectively;
    an EC reaction chamber within the reactor vessel, fluidly coupled between the first inlet and the outlet, and configured to retain consumable EC pellets;
    an EC pellet flow circuit around which the consumable EC pellets circulate as the contaminated feed stream flows through the EC reaction chamber, the EC pellet flow circuit having an annular geometry and bound, at least in substantial part, by upper and lower horizonal planes orthogonal to a centerline of the reactor vessel; and
    first and second electrodes coupled to the reactor vessel and positioned to generate an electrical field to which the consumable EC pellets are exposed when circulating around the EC pellet flow circuit to induce coagulation of contaminants within the contaminated feed stream as the contaminated feed stream flows through the EC reaction chamber.

2. The EC reactor of claim 1 wherein the EC pellet flow circuit extends around the first electrode.

3. The EC reactor of claim 2 wherein the first electrode comprises an inner annular electrode bounding an inner circumference of the EC reaction chamber.

4. The EC reactor of claim 3 wherein the second electrode comprises an outer annular electrode bounding an outer circumference of the EC reaction chamber.

5. The EC reactor of claim 1 wherein the EC pellet flow circuit has an annular geometry and is substantially concentric with a centerline of the EC reactor.

6. The EC reactor of claim 1 wherein the reactor vessel comprises an inner wall and an outer wall, wherein the first electrode forms at least a portion of the inner wall of the reactor vessel, and wherein the second electrode forms at least a portion of the outer wall of the reactor vessel.

7. The EC reactor of claim 6 further comprising a power source having a first terminal electrically connected to the first electrode at a first connection point and having a second terminal electrically connected to the second electrode at a second connection point, the first connection point radially inboard of the outer wall, and the second connection point radially outboard of the inner wall.

8. The EC reactor of claim 1 wherein the EC pellet flow circuit is substantially horizontally oriented.

9. The EC reactor of claim 1 wherein the reactor vessel further comprises:
a feed stream injection chamber fluidly coupled between the first inlet and the EC reaction chamber; and
a perforated distributor plate between the EC reaction chamber and the feed stream injection chamber.

10. An electrocoagulation (EC) reactor, comprising:
a reactor vessel having a first inlet and an outlet through which a contaminated feed stream is received and discharged, respectively;
an EC reaction chamber within the reactor vessel, fluidly coupled between the first inlet and the outlet, and configured to retain consumable EC pellets;
an EC pellet flow circuit around which the consumable EC pellets circulate as the contaminated feed stream flows through the EC reaction chamber;
first and second electrodes coupled to the reactor vessel and positioned to generate an electrical field to which the consumable EC pellets are exposed when circulating around the EC pellet flow circuit to induce coagulation of contaminants within the contaminated feed stream as the contaminated feed stream flows through the EC reaction chamber;
a feed stream injection chamber fluidly coupled between the first inlet and the EC reaction chamber; and
a perforated distributor plate between the EC reaction chamber and the feed stream injection chamber, the perforated distributor plate having a plurality of openings formed therethrough, at least a subset of which are angled with respect to a centerline of the EC reactor and oriented to impart the contaminated feed stream with a tangential flow component as the contaminated feed stream flows through the perforated distributor plate and into the EC reaction chamber.

11. The EC reactor of claim 10 wherein the perforated distributor plate comprises:
an inner annular region having a first opening density;
an outer annular region having a second opening density; and
an intermediate annular region between the inner and outer annular regions, the intermediate region having a third opening density less than at least one of the first opening density and the second opening density.

12. The EC reactor of claim 1 wherein the reactor vessel comprises:
a feed stream injection chamber fluidly coupled between the first inlet and the EC reaction chamber; and
a plurality of inlets in which the first inlet is included, the plurality of inlets circumferentially spaced around the feed stream injection chamber.

13. The EC reactor of claim 12 wherein the plurality of inlets inject the contaminated feed stream into the feed stream injection chamber along injection axes offset from a centerline of the reaction vessel so as to create a cyclonic flow pattern within the feed stream injection chamber.

14. The EC reactor of claim 1 further comprising a baffle at least partially bounding an upper portion of the EC reaction chamber, the baffle redirecting a portion of the contaminated feed stream radially outward and physically impeding outflow of the consumable EC pellets from the EC reaction chamber through the outlet during operation of the EC reactor.

15. An electrocoagulation (EC) reactor, comprising:
a reactor vessel having a first inlet at which a contaminated feed stream is received, an outlet from which the contaminated feed stream is discharged, and a feed stream flow path fluidly coupling the first inlet to the outlet;
an EC reaction chamber located within the reactor vessel and through which the feed stream flow path extends;
consumable EC pellets at least partially filling the EC reaction chamber; and
a cyclonic feed stream injection chamber fluidly coupled to the EC reaction chamber and configured to impart the contaminated feed stream with a tangential flow component when entering the EC reaction chamber to drive circulation of the consumable EC pellets around the EC reaction chamber circuit during operation of the EC reactor.

16. The EC reactor of claim 15 wherein the reactor vessel has a centerline along which the feed stream flow path extends and around which the consumable EC pellets circulate in an annular flow loop, the annular flow loop substantially coaxial with the feed stream flow path.

17. The EC reactor of claim 15 wherein the cyclonic feed stream injection chamber comprises a plurality of inlets positioned to direct the contaminated feed stream into the cyclonic feed stream injection chamber along injection axes offset from a centerline of the reaction vessel so as to create a cyclonic flow pattern within the feed stream injection chamber.

18. The EC reactor of claim 15 further comprising:
a perforated distributor plate between the EC reaction chamber and the cyclonic feed stream injection chamber; and
a plurality of openings formed through the perforated distributor plate, the plurality of openings angled with respect to a centerline of the EC reactor and oriented to impart the contaminated feed stream with a tangential flow component as the contaminated feed stream flows through the perforated distributor plate and into the EC reaction chamber.

19. The EC reactor of claim 15 further comprising:
first and second electrodes positioned to generate an electrical field to which the consumable EC pellets are exposed when circulating around the EC pellet flow circuit;
a dry cavity located within the reactor vessel; and a power connection extending from an exterior of the EC reactor, through the dry cavity, and to the first electrode to supply electrical power thereto.

20. The EC reactor of claim 15 further comprising first and second electrodes shaped and positioned to generate an annular electrical field in which the consumable EC pellets remain when traveling around the EC pellet flow circuit.

\* \* \* \* \*